Figure 1:
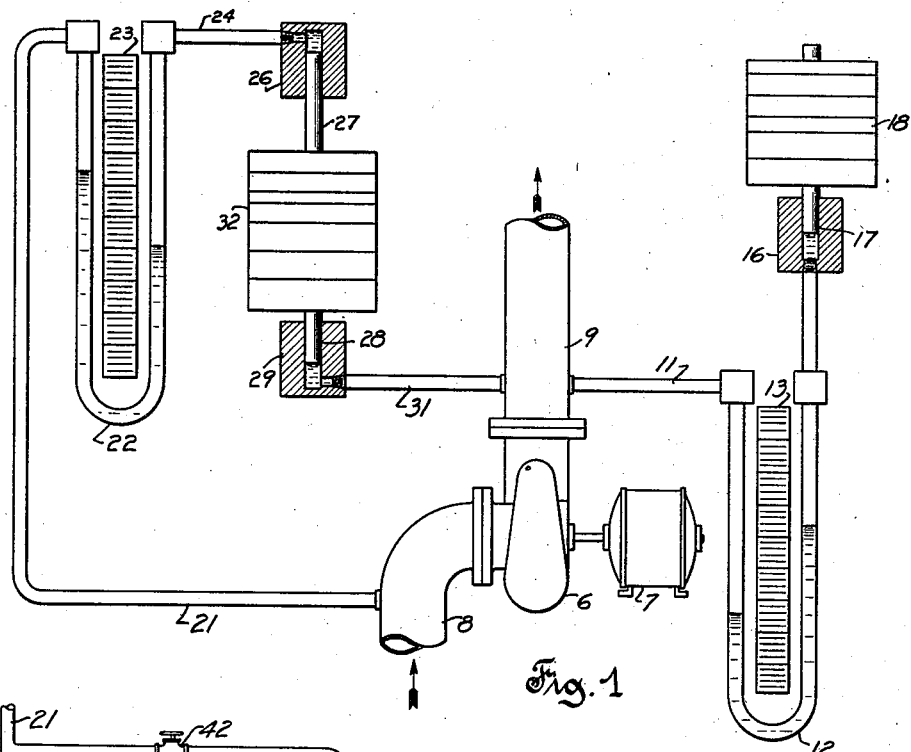

Oct. 27, 1942.  W. M. WHITE  2,300,327
PRESSURE MEASURING INSTRUMENT
Filed June 12, 1939

Inventor
W. M. White
by
Attorney

Patented Oct. 27, 1942

2,300,327

UNITED STATES PATENT OFFICE 2,300,327

PRESSURE MEASURING INSTRUMENT

William M. White, Milwaukee, Wis.

Application June 12, 1939, Serial No. 278,639

7 Claims. (Cl. 73—31)

This invention relates to improvements in pressure measuring instruments or gages and particularly to an instrument for measuring high pressures with the degree of accuracy possible only by the use of a manometer.

Heretofore it has been the practice to employ a column of fluid, of specific gravity differing from that of the fluid under pressure to be measured, to balance or oppose the pressure of a fluid to be measured. By application of a properly calibrated scale to such column, it is possible to measure directly any pressure depending upon the specific gravity of the balancing column. The most convenient form in which such column is made is in the form of a U-tube having both legs thereof partially filled with a fluid which is immiscible with and of a specific gravity differing from that of the fluid under pressure to be measured. When such manometers are, however, to be used for measurement of exceedingly high pressures such as the discharge of a high pressure pump or a high head acting on a hydraulic turbine, the fluid employed in the manometer must be mercury because of its high specific gravity. Because the quantity of mercury used must then be sufficient to balance the pressure to be measured, the measurement of heads of several hundred feet involves use of several hundred inches of mercury (specific gravity of mercury equals 13.59 and therefore one inch of mercury equals approximately one foot of water). It is, however, very difficult to handle manometers of the length required for high heads and the accuracy of measurement thereby is reduced with increasing length because of temperature variations over the total length of the manometer. The present invention therefore provides means by which a manometer is relieved of the major portion of its weight balancing function and the mercury column is chiefly employed as a vernier to secure accurate indication of the pressure. The major portion of the pressure balancing is obtained by using a cylinder connected in series with the manometer and having a piston responsive to fluid pressure and on which known weights may be applied to counterbalance the high pressure to such extent that only a small portion of the total pressure remains for balancing by the mercury column. The mercury column may therefore be made small in cross section thus securing a length of several inches, if necessary, of mercury column per foot of water or equivalent pressure to be measured. Any desired degree of accuracy in reading the pressure may thus be obtained.

It is therefore an object of the present invention to provide an instrument for indicating fluid pressures of any magnitude with any desired or required degree of accuracy.

Another object of the invention is to provide a manometer type pressure gage with means whereby the major portion of the pressure to be indicated is balanced by means other than the fluid in the gage thus permitting the use of such fluid as a vernier.

Another object of the invention is to provide a manometer type pressure gage for the measurement of high pressures which is applicable to the indication of either a single pressure or a pressure difference.

Figure 2:
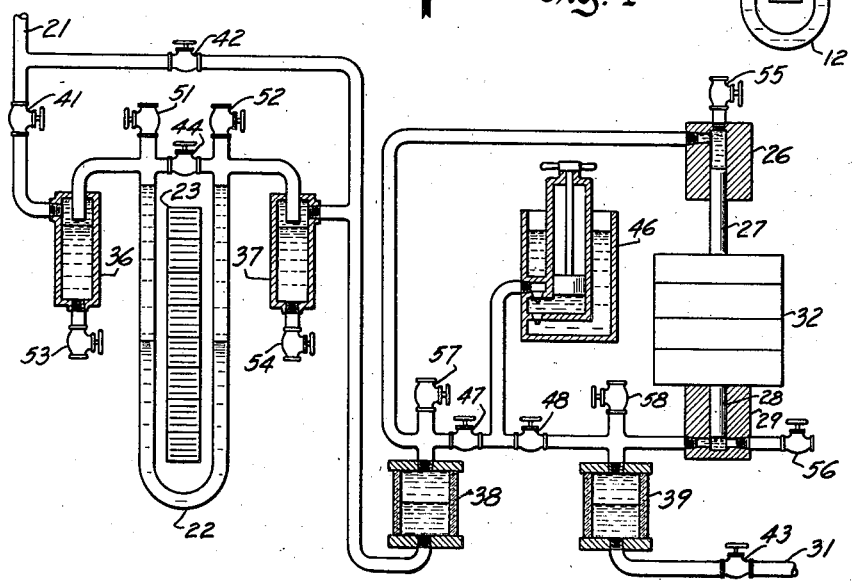

Objects and advantages other than those above set forth will be apparent from the following descriptions when read in connection with the accompanying drawing, in which:

Fig. 1 is a diagrammatic illustration, in simplified form, of the pressure gage of the present invention and shows a pump having applied on the right hand side thereof, the gage as employed for indicating single pressures and having applied to the left hand side thereof, the gage for indicating the difference between intake and discharge pressures; and Fig. 2 is a diagrammatic illustration of the gage showing the several connections and their control valves together with the means for interposing columns of an immiscible and lubricating fluid between the fluid under pressure to be measured and the pistons of the pressure balancing cylinders when such gage is adapted for either single pressure or pressure difference measurement.

Referring more specifically to the drawing by characters of reference, the reference numeral 6 designates a centrifugal pump driven by suitable driving means such as an electric motor 7, into which pump a fluid is drawn through an intake pipe 8 and is discharged through a discharge pipe 9. It will be understood that the pump and driving motor shown is only one example of a means for producing fluid pressure which it is desired or required to measure and that the pressure measuring means to be described may be applied to any source or sources whatever of fluid pressure or pressures whether such pressure or pressures are produced by one or more means. When testing the pump 6, it is desirable to measure either the discharge pressure or the difference between the intake and discharge pressure or both. When only measurement of the discharge pressure is required, the gage of the present invention may take the form shown on the right hand side of the pump 6 in Fig. 1 in which a tubular connection 11 is made from the discharge pipe 9 of the pump to one end of a tubular column preferably in the form of a U-tube 12 partially filled with a fluid of a specific gravity differing from and immiscible with the fluid being handled by the pump 6. The U-tube is provided with a suitable scale 13 mounted adjacent the tube 12 in any desired manner. The other end or leg of the U-tube 12 is connected with a cylinder 16 having a piston 17 movable therein and having the piston stem formed to receive a series of weights 18. The U-tube is preferably made of relatively small internal cross section, the piston is made with as close clearances as practical and the weights are made of different sizes. The cylinder 16 and piston 17 may take the form of the cylinder and piston in the well known "gage tester" which is a commercially developed instrument.

In use the fluid under pressure in the pump discharge 9 acts through the connection 11 on the fluid, preferably mercury, partially filling the U-tube 12 and acts through the mercury and any desired fluid, such as oil, above the mercury on the piston 17. The pressure on the piston 17 is counterbalanced by the weights 18 to such extent as to leave only a small residual unbalanced pressure for balancing by the mercury which may thus act as a vernier to indicate the pressure with any desired degree of accuracy. It is to be noted that the piston 17 and weights 18 are preferably rotated at least during the period of taking the pressure readings to replace the static friction of cylinder 16 and piston 17 by the much smaller dynamic friction.

When the difference between the intake and discharge pressure of the pump 6 is to be measured, the gage of the present invention takes the form shown on the left hand side of Fig. 1. A tubular connection 21 is made from the intake pipe 8 of the pump to one leg of a U-tube 22 partially filled with a suitable different specific gravity fluid and provided with a suitable scale 23. The other leg of the U-tube 22 is connected by way of a tube 24 with a cylinder 26 having a piston 27 movable therein and joined to a piston 28 movable in a cylinder 29. The cylinder 29 is connected by tube 31 with the discharge pipe 9 of the pump. The cylinders 26 and 29 are so arranged that movement of pistons 27 and 28 under the influence of pressure, oppose each other and the stem joining the pistons 27 and 28 is so arranged as to receive a plurality of weights 32.

In using the gage immediately above described, the relatively low intake pressure acts through the connection 21 on the fluid in the U-tube 22 and on the fluid in the connection 24 and thus acts on the shaft 27. The higher pressure acts from the pump discharge through the connection 31 on the piston 28 and is opposed by the weights 32 and the pressure on the piston 27. Only the unbalanced difference between the intake and discharge pressures need therefore be balanced by the mercury column in the U-tube 22 which may be made to have a large movement for a relatively small pressure difference and may therefore act as a vernier.

Fig. 2 illustrates a preferred form of the gage which may be employed to measure either a single pressure or a pressure difference. In the form used heretofore, the low pressure connected to the connection 21 is conducted through a mercury trap 36 to one leg of the U-tube 22, the other leg of the U-tube also being provided with a mercury trap 37. Trap 37 is connected through an oil reservoir 38 with cylinder 26 and the high pressure through connection 31 is transmitted to an oil reservoir 39 and from the oil reservoir to the space within the cylinder 29 underneath the piston 28. The connections 21 and 31 are provided with suitable control valves 41, 42 and 43 and the two legs of the U-tube 22 are joined and are connectable by way of the valve 44. The oil reservoirs 38 and 39 are connected to each other and with a suitable oil pump 46 adapted to force oil into the reservoir under pressure thus interposing a column of oil, under the control of valves 47 and 48, between the fluid being measured and the cylinders with their closely fitting pistons. The oil prevents corrosion of the cylinder and piston and also provides for lubrication thereof during the period when the pistons are being rotated in the cylinders to reduce the resistance of friction therein to the movement due to the pressure acting on the piston. All portions of the entire gage are provided with separate valves 51 to 58 inclusive by which the several portions of the system may be filled or emptied or by which air may be discharged from the system.

It will be understood that the present invention provides a pressure measuring instrument or system in which the major portion of the pressure to be indicated is balanced by means other than a fluid in the manometer portion of the instrument thus allowing construction of the manometer itself as a vernier for measuring pressures of any magnitude with any desired degree of accuracy. The instrument is applicable in the form shown in Fig. 2, to measurement of single pressures as well as pressure differences merely by the proper manipulation of valves, that is a single pressure measurement requires only that the pressure be applied to the lower weight loaded piston with the manometer in series therewith and with connection 21 open to atmosphere. Such series connection is obtained when valves 42 and 44 are closed and valve 41 is open. It will be understood that valves 51 to 58, inclusive, are closed when any measurement is being made and that valves 47 and 48 are opened only when oil is to be introduced into the system by the oil pump 46.

Although but one embodiment of the present invention is illustrated and described, it will be apparent to those skilled in the art that various changes and modifications may be made therein without departing from the spirit of the invention or from the scope of the appended claims.

It is claimed and desired to secure by Letters Patent:

1. An instrument for measuring pressure differences comprising a plurality of sources of fluid under pressure, a plurality of cylinders having interconnected pistons movable therein in opposition to each other, one of said cylinders being directly connected with one of said sources of pressure, the movements of said pistons responsive to pressures acting severally thereon opposing each other and tending to balance each other, means applicable to the pistons for partially balancing the remaining unbalanced pressure acting thereon, and a U-tube gage containing an indicating liquid of a specific gravity other than the fluid under pressure and connected with one of said sources of pressure and with one of said cylinders to measure the unbalanced portion of pressure.

2. An instrument for measuring pressure differences between two sources of fluid pressure comprising two opposed cylinders having weighted and interconnected opposed pistons movable therein and having one of said cylinders connected with the one of said sources of pressure, and a mercury manometer connected between the other of said sources of pressure and the other of said cylinders and coacting therewith to aid in pressure balancing thereby, the major portion of the differential pressure being resisted by the differential action of the said weighted pistons and the unbalanced portion of the pressure being balanced by the said mercury manometer.

3. An instrument for measuring pressure differences comprising a plurality of sources of fluid under pressure, a plurality of alined cylinders having interconnected pistons movable therein, one of said cylinders being directly connected with one of said sources of pressure, the movements of said pistons responsive to opposed pressures acting thereon from said sources and tending to balance each other, removable weights mounted on the pistons for partially balancing the pressures acting thereon, and a U-tube manometer connected with the other of said cylinders and the other of said sources to measure the unbalanced portion of pressure.

4. An instrument for measuring pressure differences comprising a plurality of sources of fluid under pressure, a plurality of alined cylinders having interconnected pistons movable therein and being severally connected with said sources of pressure, the movements of said pistons responsive to pressure acting thereon tending to balance each other, means applicable to the pistons for partially balancing the remaining unbalanced pressure acting thereon, a U-tube gage containing an indicating fluid of a specific gravity other than the fluid under pressure and connected with one of said sources of pressure and with one of said cylinders to measure the unbalanced portion of pressure, and means interposing columns of immiscible and lubricating fluid between the pistons and the fluids under pressure.

5. An instrument for measuring pressure differences comprising a plurality of sources of fluid under pressure, a plurality of alined cylinders having interconnected pistons movable therein and being severally connected with said sources of pressure, the movements of said pistons responsive to pressure acting thereon tending to balance each other, means applicable to the pistons for partially balancing the remaining unbalanced pressure acting thereon, a U-tube gage containing an indicating fluid of a specific gravity other than the fluid under pressure and connected with one of said sources of pressure and with one of said cylinders to measure the unbalanced portion of pressure, a plurality of oil reservoirs severally connected between one of said sources of pressure and one of said cylinders and between the other of said cylinders and said gage for interposing bodies of oil between the fluid under pressure and said pistons, and a pump for forcing oil into said reservoirs against the pressure of the fluids.

6. An instrument for measuring pressure differences between a source of variable higher fluid pressure and a source of variable lower fluid pressure and comprising a cylinder connected with said higher pressure source and having a piston movable therein, a U-tube filled with fluid and connected at one end thereof with said lower pressure source, a second cylinder having a piston movable therein and connected with the other end of said U-tube, said cylinders being in alinement and said pistons being interconnected, the movements of said pistons responsive to pressure differences being in opposition to each other, and removable weights acting on said pistons for partially balancing the pressure differences causing movements thereof, the fluid in said U-tube balancing the remaining unbalanced pressure acting on said pistons.

7. An instrument for measuring pressure differences between a source of variable higher fluid pressure and a source of variable lower fluid pressure and comprising a cylinder having a piston movable therein, a U-tube filled with fluid and connected at one end thereof with said lower pressure source, a second cylinder having a piston movable therein, said cylinders being in alinement and said pistons being interconnected, the movements of said pistons responsive to pressure differences being in opposition to each other, removable weights acting on said pistons for partially balancing the pressure differences causing movements thereof, a plurality of oil reservoirs, one of said reservoirs connecting said higher pressure source with the first said cylinder and another of said reservoirs connecting the second said cylinder with the other end of said U-tube, and a pump for forcing oil into said reservoirs against the action of the fluid under pressure, the fluid in said U-tube balancing the remaining unbalanced pressures acting on said pistons.

WILLIAM M. WHITE.